United States Patent [19]

Uchida et al.

[11] Patent Number: 5,618,617
[45] Date of Patent: Apr. 8, 1997

[54] MAGNETO-OPTIC DISK

[75] Inventors: Kiyoshi Uchida, Katano; Norio Miyatake, Kobe; Kazunori Omoya, Hirakata, all of Japan

[73] Assignee: Matsushita Electric Industrial Co., Ltd., Osaka, Japan

[21] Appl. No.: 288,695

[22] Filed: Aug. 12, 1994

Related U.S. Application Data

[63] Continuation-in-part of Ser. No. 983,756, Dec. 1, 1992, abandoned.

[30] Foreign Application Priority Data

Dec. 2, 1991 [JP] Japan .................. 3-317933
May 27, 1992 [JP] Japan .................. 4-134690

[51] Int. Cl.⁶ .............. G11B 5/66; B32B 5/16; B05D 5/12
[52] U.S. Cl. .......... 428/323; 428/327; 428/328; 428/329; 428/330; 428/331; 428/336; 428/357; 428/402; 428/403; 428/404; 428/407; 428/694 ML; 428/694 DE; 428/694 TP; 428/694 BP; 428/694 BN; 428/900; 427/127; 427/128; 427/129; 427/130
[58] Field of Search ............ 428/694 ML, 694 DE, 428/900, 323, 327, 328, 329, 330, 331, 336, 357, 402, 403, 404, 407, 694 TP, 694 BP, 694 BN; 427/127, 128, 129, 130

[56] References Cited

U.S. PATENT DOCUMENTS

| | | | |
|---|---|---|---|
| 5,094,916 | 3/1992 | Sasaki | 428/425.9 |
| 5,096,774 | 3/1992 | Sano | 428/323 |
| 5,212,019 | 3/1993 | Ryoke | 428/694 BB |
| 5,215,833 | 1/1993 | Goto | 428/694 BP |

FOREIGN PATENT DOCUMENTS 63-229643  9/1988  Japan .
315839  11/1992  Japan .

Primary Examiner—Leszek Kiliman
Attorney, Agent, or Firm—Wenderoth, Lind & Ponack

[57] ABSTRACT

In a magneto-optic disk, a protective coating is applied to the magnetic recording layer made from a composite comprising minute particles of an inorganic compound, a lubricant and a radical-polymerizable resin. The surfaces of the minute particles of the first type are coated with a surface coating agent which has a lyophilic property with the radical-polymerized resin and this surface coating prevents the minute particles from forming aggregates in the protective coating. Then, the surface of the protective coating becomes smooth. In another type of protective coating, two types of the minute particles are included. The surfaces of the minute particles of the first type are coated with a surface coating agent, while those of the second type remain not coated. Thus, the minute particles of the first kind are not liable to form aggregates in the protective coating, whereas those of the other kind may form aggregates. Although the aggregates decrease the smoothness of the protective coating, they can enhance the amount of the lubricant which can be incorporated in the coating.

36 Claims, 9 Drawing Sheets

MAGNETO-OPTIC DISK

CROSS-REFERENCE TO RELATED APPLICATION

This application is a continuation-in-part application of Ser. No. 07/983,756, filed Dec. 1, 1992 now abandoned.

BACKGROUND OF THE INVENTION

1. Field of the Invention

The present invention relates to a magneto-optic disc for recording image, sound or code information.

2. Description of the Prior Art

Recently, a magneto-optic disk has attracted much attention as a high packing density recording medium. For example, in a conventional magneto-optic disk, a substrate has concentric circular pre-grooves, and a first protective film, a magnetic recording film, a second protective film, a reflection film and a protective coating are formed successively on the substrate. The substrate is made of an optically transparent material such as polycarbonate. The recording film is made of an alloy of a rare earth with transition metals such as TbFeCo. The protective films are made of, for example, silicon nitride and prevent the oxidation of the recording film. The reflection film is made of aluminum or an aluminum alloy and improves the detection efficiency of readout signals and controls the thermal diffusion. The protective coating is made of an ultra-violet-ray setting resin or the like and enhances the moisture-proof effect.

Magnetic field modulation recording is one of the methods of recording information in a magneto-optic disk. One of the advantages of this method is that it can perform direct overwrite of information and that it is appropriate for pulse length modulation recording.

In magnetic field modulation recording, while a laser beam not modulated and converged by an objective lens scans along the pre-grooves, the bias magnetic field is modulated simultaneously to change the direction of the magnetization at a portion of the magnetic recording film illuminated by the laser beam. The modulated bias magnetic field necessary for reversing the magnetization is generated, for example, with a floating magnetic head used in a magnetic disk drive (refer, for example, to Japanese Patent laid open Publication No. 229643/1988).

The modulated bias magnetic field is generated, for example, by supplying a modulated current to a coil of the magnetic head. The magnetic field is high enough to reverse the magnetization only in a restricted region near the magnetic head. Then, the distance between the illuminated portion of the magnetic recording film and the magnetic head has to be as short as possible.

The floating magnetic head comprises a magnetic head, a slider and a support mechanism. The magnetic head floats low on the protective coating due to the gas lubrication effect when the magneto-optic disk is rotated. Thus, the illuminated portion of the magneto-optic disk can be held within an effective range of magnetic field near the magnetic head. The contact start/stop (CSS) method makes it possible to use a compact structure of the magnetic head and the support of the slider. In the contact start/stop method, the magnetic head rests on the magneto-optic disk when the disk is not rotated, while it floats due to the gas lubrication effect when the disk is rotated.

In order to secure stable recording in the contact start/stop method, the magnetic head has to float smoothly on the magneto-optic disk. Therefore, the protective coating of the magneto-optic disk on which the slider slides has to satisfy the following conditions:

a) Foreign materials which may hinder the stable floating and sliding of the slider do not exist at the surface of the protective coating.

b) The recording information of the magnetic recording film is not destroyed during contact of the disk with the magnetic head or the slider.

c) The sliding and the floating of the slider is not hindered in any contact thereof with the protective coating.

d) The absorption force between the protective coating and the slider which exceeds the motive force is not generated when the rotation of the magneto-optic disk is stopped.

In order to satisfy the above-mentioned conditions, it is suggested that a protective coating made from a thermosetting resin, alumina minute particles, a thermoplastic resin and a lubricant is applied to a recording medium and that a film of fluorinated carbon oil is further applied to the protective coating (Japanese Patent laid open Publication No. 229,643/1988). However, the inventors found that the floating stability of the magnetic head for a magneto-optic disk with such a protective coating is so bad as to cause many imperfect recording spots. By investigating the problem, the inventors found that alumina minute particles aggregate in the protective coating to form protrusions higher than the floating height of the slider at the surface of the protective coating. Thus, when a magneto-optic disk is rotated, such protrusions may collide with the slider or may obstruct the stable floating of the slider. Further, composites made from alumina minute particles and the thermosetting resin may be exfoliated from protrusions, so that they may scatter on the protective coating or adhere to the slider. Then, the stable floating of the slider is hindered, and the bias magnetic field applied to the magnetic recording film may become insufficient and increase errors.

SUMMARY OF THE INVENTION

An object of the present invention is to provide a magneto-optic disk for magnetic field modulation recording to which the bias magnetic field can be applied stably in a magneto-optic drive having a float-type magnetic head.

In one aspect of the present invention, a magneto-optic disk comprises a substrate, a magneto-optic recording layer applied to the substrate, and a protective coating applied to the magneto-optic recording layer, the protective coating being made from a composite comprising minute particles of an inorganic compound, a lubricant and a radical-polymerizable resin. The surfaces of the minute particles are coated with a surface coating agent before preparing the composite. The surface coating agent has a lyophilic property with the radical-polymerized resin and this surface coating prevents the minute particles from forming aggregates in the protective coating.

In another aspect of the present invention, a protective coating applied to the magneto-optic recording layer, is made from a composite comprising a first type of minute particles of an inorganic compound, a second type of minute particles of the inorganic compound, a surface coating agent, a lubricant and a radical-polymerizable resin. The surfaces of the minute particles of the first type are coated with a surface coating agent, while those of the second type are not coated with a surface coating agent. The surface coating agent has a lyophilic property with the radical-polymerized resin. Thus, the minute particles of the first kind are not liable to form aggregates in the protective coating, whereas those of the other kind may form aggregates. Thus, the sizes of the aggregates decrease in the protective coating, while they can enhance the amount of the lubricant occluded in the protection coating.

In a third aspect of the invention, an adhesive layer is interposed between a magneto-optical recording medium and a protective coating. The protective layer may be either type described in the first and second aspects. The adhesive layer can improve the resistance of the protective layer against being crushed by a slider and can prevent cracking of the protective layer.

An advantage of the present invention is that the surface of the protective coating of a magneto-optic disk becomes smooth.

Another advantage of the present invention is that the lifetime of the protective coating can be improved.

A further advantage of the invention is that damage of the magneto-optic recording medium of a magneto-optic disk can be decreased.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
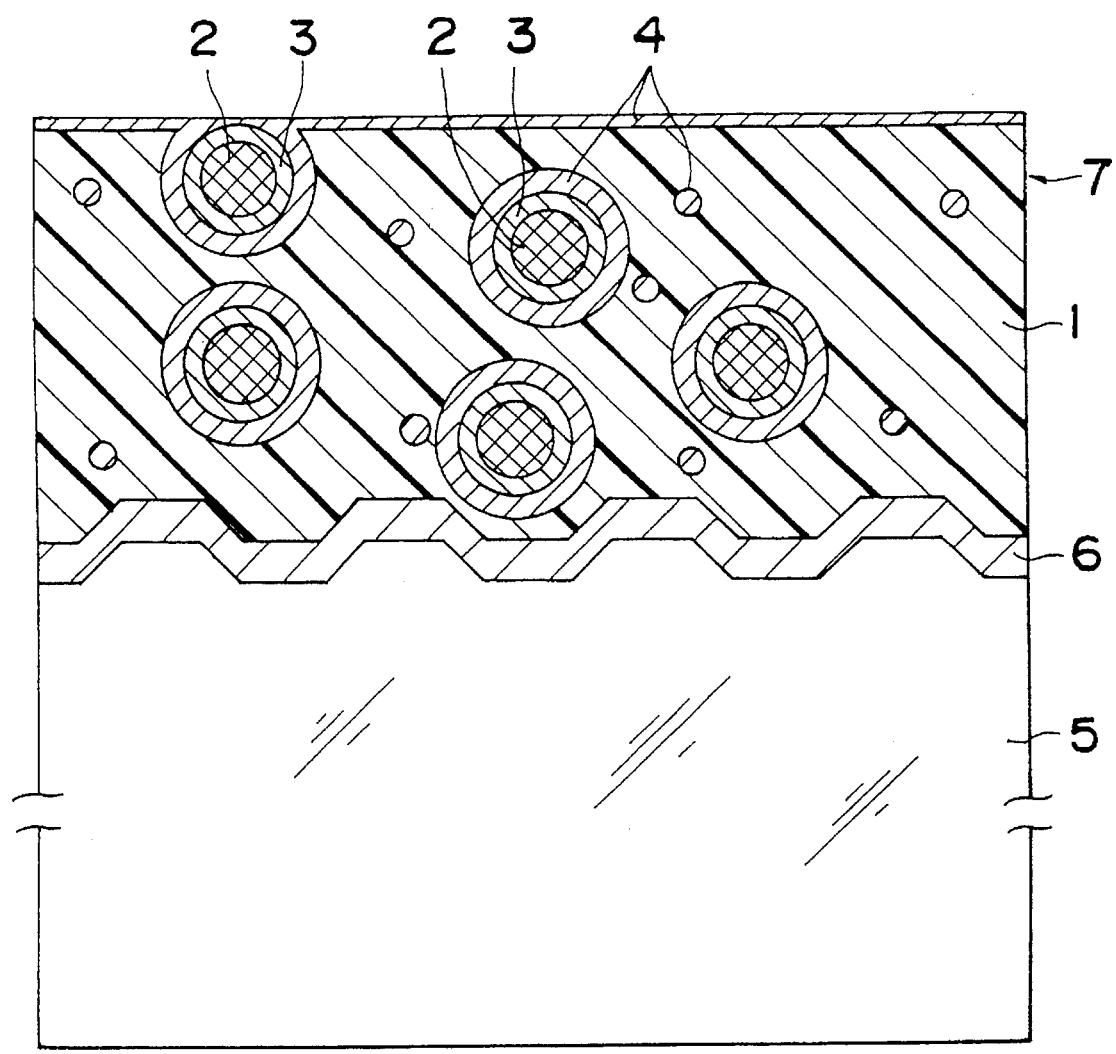
FIG. 1 is a schematic sectional view of a first type of magneto-optic disk.

Embodiments of the present invention will be explained below with reference to the accompanying drawings. FIG. 1 shows a schematic section of a magneto-optic disk which can be used for magnetic field modulation recording. In the magneto-optic disk, a magneto-optic recording layer 6 is formed on a groove plane of a substrate 5, and a protective coating 7 is formed on the magneto-optic recording layer 6. The substrate 5 is made from an optically transparent polycarbonate on which substantially circular grooves are formed. The magneto-optic recording layer 6 comprises, for example, a protection film made mainly from silicon nitride applied to the groove plane, a recording film made mainly from TbFeCo and a reflection film made mainly from aluminum, which films are prepared successively with a thin film growth technique such as sputtering process or the like.

The protective coating 7 comprises a radical-polymerizable compound 1, minute inorganic particles 2 subjected to the surface coating with a surface coating agent 3, and a lubricant 4. The surface coating agent 3 has a lyophilic property with the radical-polymerized compound 1.

The phosphazen ultra-violet-ray setting resin (Idemitsu Petrochemical Co., Ltd., trade name PPZ) is used as the radical-polymerizable compound 1, and it has prepolymers of the following formula:

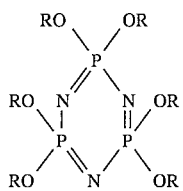

wherein R denotes

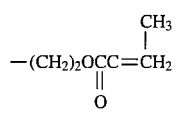

Alumina particles (Sumitomo Chemical Co., Ltd., trade name AKP-50) of 0.4 μm average particle size are used as an example of the inorganic minute particles 2. The average particle size is one of representations of the size in minute particles. A sum of masses of particles of the average particle size or less have 50% of the total mass. An alkoxy silane of the following formula is used as the surface coating agent 3:

$$R-Si(OCH_3)_3,$$

wherein R denotes the following group:

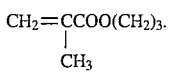

It covers the surface of the alumina particles 2. The lubricant 4 is prepared by mixing n-butyl stearate and oleyl oleate (Takemoto Oil & Fat Co., Ltd., trade name MTL-103) at a ratio of 1:2.

As the surface coating agent 3 for the inorganic minute particles 2, for example metallic soaps which are represented by the following formulas may also be used:

$$(R-COO)_nM,$$

$$R-SO_3M$$

and $$(RO)_n-PO_2M,$$

wherein R denotes an alkyl group, M denotes a metallic ion, and n is an integer from one to four. Further, a surface active agent of a polyethylene glycol ether or a polyethylene glycol ester such as alkyl ether, alkyl ester, alkyl amine, alkyl amide, glycerine ester or sorbitan ester may also be used. Still further, such a compound may also be used as polyacrylate ester, polyamine, fluorine-contained resin, silicone resin, or a compound represented by the following formula:

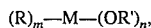

wherein R denotes an alkyl group, M denotes Si, Ti or Al, R' denotes $CH_3$, $C_2H_5$ or $C_3H_7$, m is an integer between one to three and n is an integer between one to three.

In the surface coating of the inorganic minute particles 2 with the surface coating agent 3, the surface coating agent 3 as stocked or diluted with a solvent is mixed with the inorganic minute particles 2, and the surface coating agent 3 is adhered to or reacted with the surface of the inorganic minute particles 2 at room temperature or preferably under heating. The amount of the surface coating agent 3 adhered to or reacted with the particles 2 is usually between 1–3 wt %, but it may be increased or decreased according to the intensity of the coating effect.

The surface coating can improve the lyophilic property of the inorganic minute particles 2 with the radical-polymerized compounds 1, so that the dispersion of the inorganic minute particles 2 in the radical-polymerized compounds 1 is improved and the minute particles are not liable to form aggregates in the protective coating 7.

The lubricant 4 may comprise a plurality of compounds selected from long chain fatty acids, fatty esters, carbon fluorides, silicone derivatives, fatty salts and fatty amides. It is preferable to use long chain fatty acids, fatty esters and carbon fluorides in order to secure good lubrication.

It is important to store the lubricant 4 in the protective coating 7 in order to supply the lubricant 4 onto the surface of the protective coating 7 for a long time. That is, the lubricant 4 performs effective lubricating action because it covers the surface of the protective coating 7 with a very thin uniform surface film of the thickness of very thin molecular layers, as shown in FIG. 1. However, the lubricant 4 on the protective coating 7 is lost little by little due to its removal to the slider 10 caused by the repetition of contact start/stop, the evaporation into air, the adhesion of dusts or the like. Therefore, the lubricating action becomes insufficient after a long time. In order to compensate the loss of the lubricant 4, when the amount of the lubricant 4 on the surface of the protective coating 7 decreases, the lubricant 4 occluded in the protective coating 7 runs to the surface of the protective coating 7 so as to supply the lubricant 4 to the surface. The lubricant 4 is occluded in voids in the radical-polymerized compounds 1 and the interface of the inorganic minute particles 2 with the radical-polymerized compounds 1. In the present invention, the amount of the lubricant 4 contained in the protective coating 7 is increased by using minute holes formed in the inorganic minute particles 2 and voids formed around the contact points between inorganic minute particles 2 as sites to occlude the lubricant 4.

In the process of forming the protective coating 7, the alkoxy silane 3 is diluted with a solvent first, and the alumina particles as inorganic minute particles 2 are mixed with the diluted solution of the alkoxy silane 3. Then, the solution is agitated and heated in order to cover the surface of the alumina particles 2 with the alkoxy silane. The amount of the alkoxy silane 3 adhered to the surfaces of the alumina particles 2 is 1.5 wt %. Then, the alumina particles 2 subjected to this surface coating are dispersed in the phosphazen resin 1 to prepare a slurry for 20 minutes with a sand mill. The lubricant 4 is mixed further with the slurry. The resultant mixture is applied to the magneto-optic recording layer 6 with spin coating, and the applied layer is radiated with ultra-violet rays in order to set the phosphazen resin 1. The amount of the alumina particles 2 in the protective coating 7 is 10 wt %, while that of the lubricant is 10 wt %.

Figure 2:
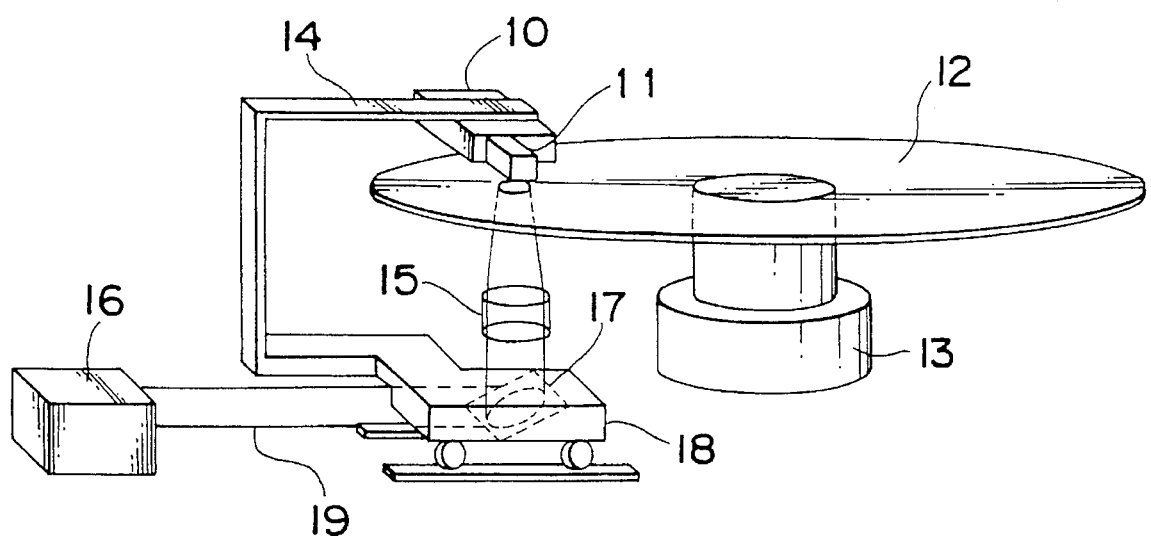
FIG. 2 is a schematic perspective view of a magneto-optic drive with use of a magneto-optic disk.

As shown in FIG. 2, a magneto-optic disk 12 with the protection coating 7 produced as mentioned above is provided in a magneto-optic disk drive in order to observe the run characteristics of a magnetic head 11 and a slider 10 and the recording characteristics of the magneto-optic disk 12. The magnetic head 11 and the slider 10 face the protective coating 7 of the magneto-optic disk 12, which is revolved by a driver 13. The magnetic head 11 comprising a coil and a magnetic core is fixed to the slider 10. The slider 10 has a size of 4 mm×4 mm, and it is fixed to a supporter 14 which comprises a ginbal spring, a suspension spring or a load beam. The supporter 14 is moved in a radial direction of the disk 12 by a moving mechanism 18 comprising a linear motor and a slide guide. An optical head 16 comprises a laser diode, a photodiode, a polarizing beam split-lens and a collimator lens. A laser beam 19 generated by the optical head 16 is reflected by a mirror 17 and goes through an object lens 15 to illuminate the substrate 5 of the magneto-optic disk 12.

In order to make sure that the bias magnetic field can be applied stably in a magneto-optic drive having a floating-type magnetic head 11 in the contact start/stop method, the surface state of the protective coating 7 of a magneto-optic disk has to satisfy the following conditions:

(a) The surface of the protective coating 7 is smooth enough not to hinder the stable floating and sliding of the slider 10, or the maximum surface roughness is desirable to be 0.1 μm or smaller. The flying height of the slider 10 is 2.0 μm. On the other hand, the maximum surface roughness is desirable to be 0.03 μm or larger enough to prevent the adsorption of the slider 10 with the protective coating 7.

(b) The lubrication of the protective coating 7 is carried out by the lubricant 4 adsorbed in the protective coating 7. Thus, the protective coating 7 has a structure which can occlude an appropriate amount of the lubricant 4 to be supplied onto the surface of the protective coating 7 for a long time.

(c) The hardness of the protective coating 7 is desirable to be high in order to enhance the scratch resistance. Especially, when a ceramics is used as a material for the slider 10, this requirement has to be satisfied to a high degree.

In the process of applying a protective coating 7 to the surface of a magnetic recording layer 6 of the magneto-optic disk 1, a radical-polymerizable compound 1, alumina particles 2 subjected to the surface coating and a lubricant 4 are mixed first. Then, spin coating or screen printing is used to apply the protective layer 7 up to a prescribed thickness. Next, the radical polymerizable compound 1 is subjected to heating or to radiation of light or electron beam in order to accelerate the setting reaction of the radical polymerizable compound 1 so as to form the protective coating 7. Thus, inorganic minute particles 2 are distributed almost perfectly as primary or respective particles in the radical-polymerized compounds 1 due to the surface coating, and protrusions on the surface of the protective coating 7 due to aggregates of the minute particles are not generated. Then, the floating of the slider is stabilized on the magneto-optical disk 12. Therefore, the magnetic field can be applied surely to the magnetic recording layer 6 on recording, so that the magneto-optic disk 12 can record data surely.

Further, the recording can be conducted surely even at bad conditions such as high temperature and high humidity, by restricting the specific surface area of minute particles 2 included in the protective coating 7 in a certain range.

In the experiments to be explained below, the revolution number of the revolution driver 13 is set as 3,000 rpm and the recording position is at 70 mm of diameter of the disk 12.

Figure 3A:
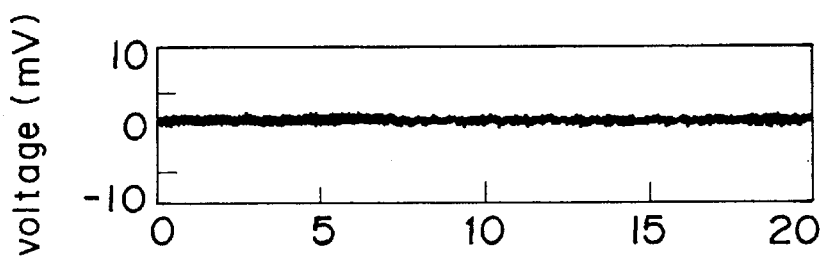
FIGS. 3A, 3B and 3C are diagrams of the output waveform of the voltage detected with a search coil attached to the slider of the drive.
Figure 3B:
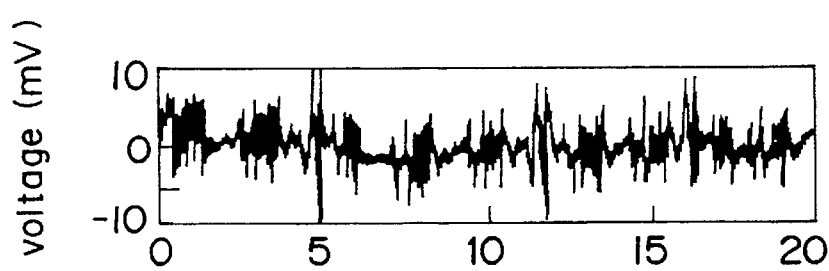
Figure 3C:
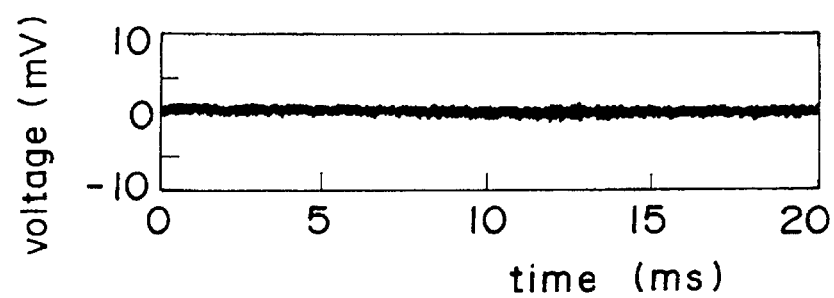

A waveform of the vibrations of the slider 10 is detected with a search coil attached to the slider 10 while a magneto-optic disk 12 set in the drive as shown in FIG. 2 is revolved by the driver 13. FIGS. 3A and 3C show waveforms of the detected voltage with the search coil when the slider is floated and stopped on the protective coating 7 of the magneto-optic disk 12, while FIG. 3B shows a waveform detected for comparison on a magneto-optic disk with a protective coating produced by using alumina particles which have not been subjected to the surface coating. It is to be noted that the waveform displayed in FIG. 3A agrees with that in FIG. 3C. Then, it is considered that the slider 10 floats stably on the protective coating 7. Further, the error ratios on recording/reading are $5 \times 10^{-6}$ and $5 \times 10^{-5}$ in cases of FIGS. 3A and 3B in the same recording conditions, respectively, wherein a detected signal of 70% or less of the normal signal for a pit is defined as an error. When the magnetic head 11 used in the experiments is 50 µm or more away from the recording position on the magneto-optic disk 12, it cannot record a signal perfectly because of the insufficiency of bias magnetic field. Therefore, it is interpreted that little protrusions which cause vibrations of 50 µm or more to the magnetic head 11 exist on the protective coating 7 of this example.

Figure 4:
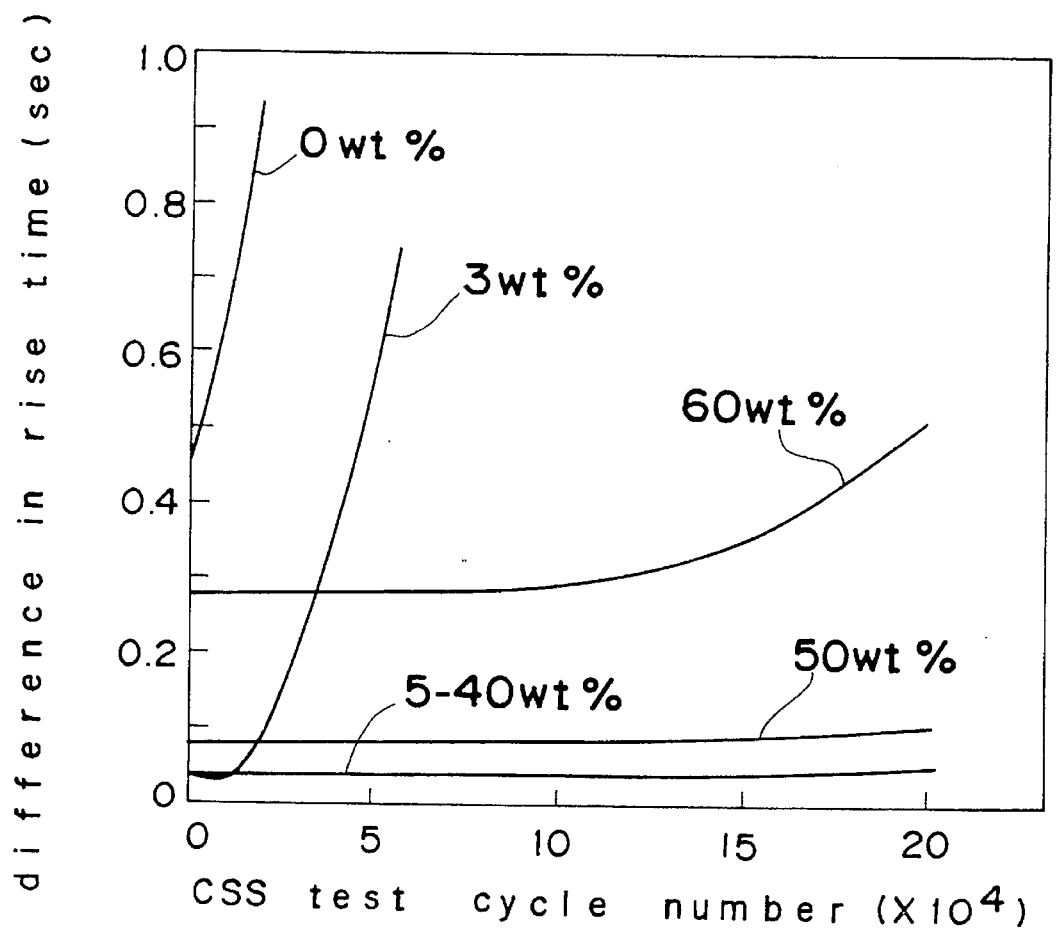
FIG. 4 is a graph of the rise time of the disk drive plotted against the contact start/stop times.

FIG. 4 shows the rise time of the disk revolution driver 13 plotted against the contact start/stop (referred to as CSS) test cycle number when the cycle is repeated up to two hundred thousand times. The parameter displayed in FIG. 4 is the amount of alumina particles 2 contained in the protective coating 7. FIG. 4 includes the data of a magneto-optic disk 12 for comparison including no alumina particles (0 wt %). When the amount of the alumina particles 2 is less than 5 wt %, the apparent hardness of the protective coating 7 decreases and the surface roughness thereof decreases due to the repetitive sliding of the slider 10. Thus, the rise time increases sharply at about $10^4$ times of CSS test cycles due to the adsorption of the slider 10 to the protective coating 7. When the amount exceeds 50 wt %, the resistance on the sliding of the slider 10 increases, and the rise time is high from the start of the test.

When the amount of the alumina particles 2 is between 5 and 50 wt %, the sliding and the floating of the slider 10 cannot be hindered and the bias magnetic field can be applied stably by the magnetic head 11 to the illuminated position.

In the present embodiment, a phosphazen ultra-ray setting resin is used as an example of the radical polymerizable compound 1 which is one of the main components of the protective coating 7. Other radical polymerizable compounds of pencil hardness of 2H or harder can also be used to obtain similar advantages. The radical polymerization compound 2 may be a conventional setting resin which is used for the protective coating of a magneto-optic disk. For example, it may be a photo-setting resin composite, a thermosetting resin composite, an electron-beam-setting resin composite or a cold-setting resin composite. Among them, a photo-setting resin composite is appropriate because the setting completes in a short time and the resin will not be contaminated by impurities in such a short time. An ultraviolet-ray-setting resin composite, especially a resin composite including a phosphazen resin composite as a prepolymer component, is preferable because it can be reacted in an usual environment. A phosphazen ultraviolet-ray-setting resin has a phosphazen skeleton made from P and N and six setting groups, so that the hardness of the protective film is as high as 9H of pencil hardness. Therefore, such a resin composite is very favorable in order to secure the hardness of the protective coating 7. A photo-setting resin such as an epoxy resin, an acrylic resin, an epoxyacrylate resin or an urethane resin can also be used for the protective coating 7.

The thickness of the protective coating 7 is preferably between 3 and 50 µm, more preferably between 5 and 10 µm. If the thickness is less than 3 µm, the magnetic recording layer 6 is liable to be affected by the humidity. If the thickness is less than 5 µm, the strength of the protective coating 7 may not be sufficient as concerns mechanical protection on impacts with the slider 10. On the other hand, if it is larger than 10 µm, the contraction of the protective coating 7 on the setting may become too large to deteriorate the read out characteristics, while if it is larger than 50 µm, a sufficient magnetic field cannot be applied to the magnetic layer 6.

In the present embodiment, alumina particles are used as inorganic minute particles 2. The inorganic minute particles 2 may be made of silica, zirconia, silicon nitride, silicon carbide, tungsten carbide, titania, magnesia, forsterite, steatite, mullite, cordierite, potassium titanate, barium titanate or the like. However, because the thickness of the protective coating 7 is limited between 3–50 µm, preferably between 5–10 µm, it is favorable that the average particle size of the inorganic minute particles 2 is between 0.05–0.5 µm and the particle size distribution is between 0.02–2 µm. The lower particle size 0.02 µm is limited by the technological limit of the production of minute particles 2, while the upper one 2 µm is limited in order to decrease the density of high protrusions. From these points of view, alumina, silica, zirconia, silicon nitride, silicon carbide or the like is favorable because a material having a uniform particle size distribution is available and its hardness is relatively high.

The amount of the inorganic minute particles 2 in the protective coating 7 is preferably between 5–50 wt %. If the amount is lower than 5 wt %, the apparent hardness of the protective coating 7 decreases to deteriorate the sliding characteristic of the slider 10 and the resistance against the impact of the magnetic head 11. Eventually, the surface roughness of the protective coating 7 decreases to 0.03 µm or less and the slider 10 may be adsorbed to the protective coating 7 when the slider 10 rests on the disk. On the other hand, if the amount is larger than 50 wt %, the surface roughness exceeds 0.1 µm, and the stability of the sliding of the slider 10 is disturbed by protrusions.

TABLE 1

| disk number | Specific Surface Data of Disks | | | | |
| --- | --- | --- | --- | --- | --- |
| | A1 | A2 | A3 | A4 | A5 |
| specific surface area (m²/g) | 10 | 50 | 100 | 300 | 1000 |

Figure 5:
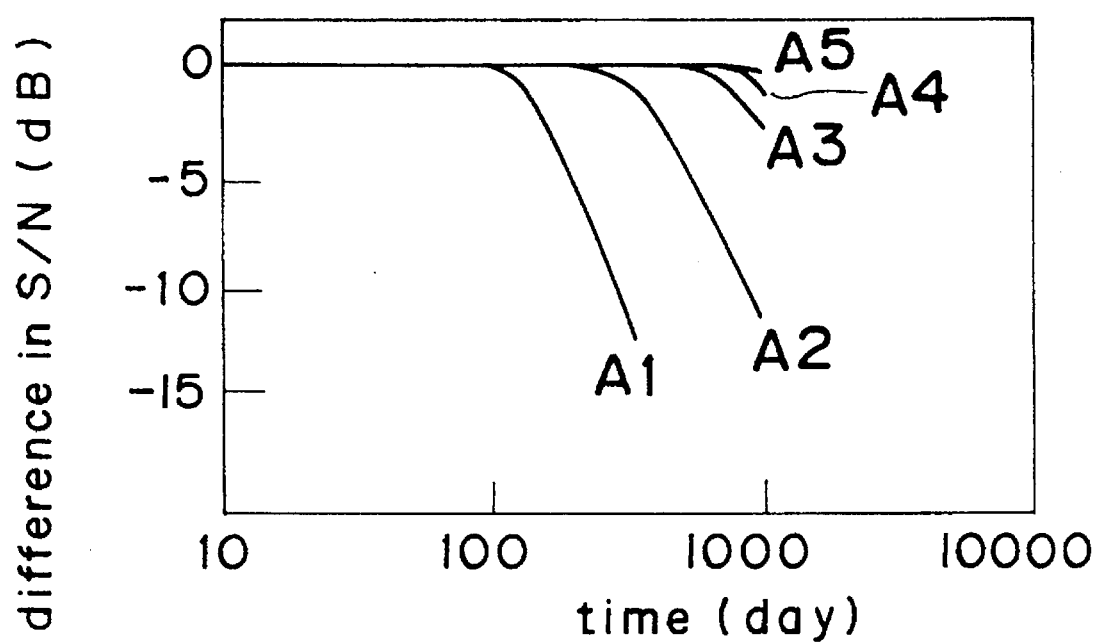
FIG. 5 is a graph of the S/N ratio of regeneration plotted against time.

FIG. 5 shows the effect of the specific surface area on the difference in S/N of the five samples of magneto-optic disks 12 with a protective coating 7 including 5 % of alumina particles 2 of various specific surface areas compiled in Table 1. The specific surface area is obtained according to the BET (Brunauer-Emmett-Teller) adsorption isotherm. Minute particles 2 of specific surface area larger than 1000 m²/g are not available. The contact start/stop and recording/readout are repeated for the disks at an interval of fifteen minutes in a bad environment of 60° C. of temperature and 80% of relative humidity. It is clear that if the specific surface area increases, the time when the degradation of the signal quality is observed due to the degradation of the contact start/stop characteristics can be delayed. This tendency can be observed also for protective coatings which include the above-mentioned minute particles other than alumina particles 2. Therefore, it is preferable to use minute particles 2 having a specific surface area of 100 m²/g or more when a magneto-optic disk 12 is used at a bad condition such as high temperature and high humidity.

The surface area of inorganic minute particles 2 is increased by increasing the specific surface area thereof. By using the inorganic minute particles 2 of specific surface area of 100–1000 m²/g according to BET isotherm, the occlusion property of the lubricant 4 in the protective coating 7 can be enhanced and the supply performance of the lubricant 4 onto the surface can be improved. Thus, the amount of the lubricant 4 which can be occluded in the protective coating 7 can be increased and the lubricant 4 can be supplied stably to the surface of the protective coating 7 so that the sliding resistance of the protective coating 7 can be improved.

Figure 6:
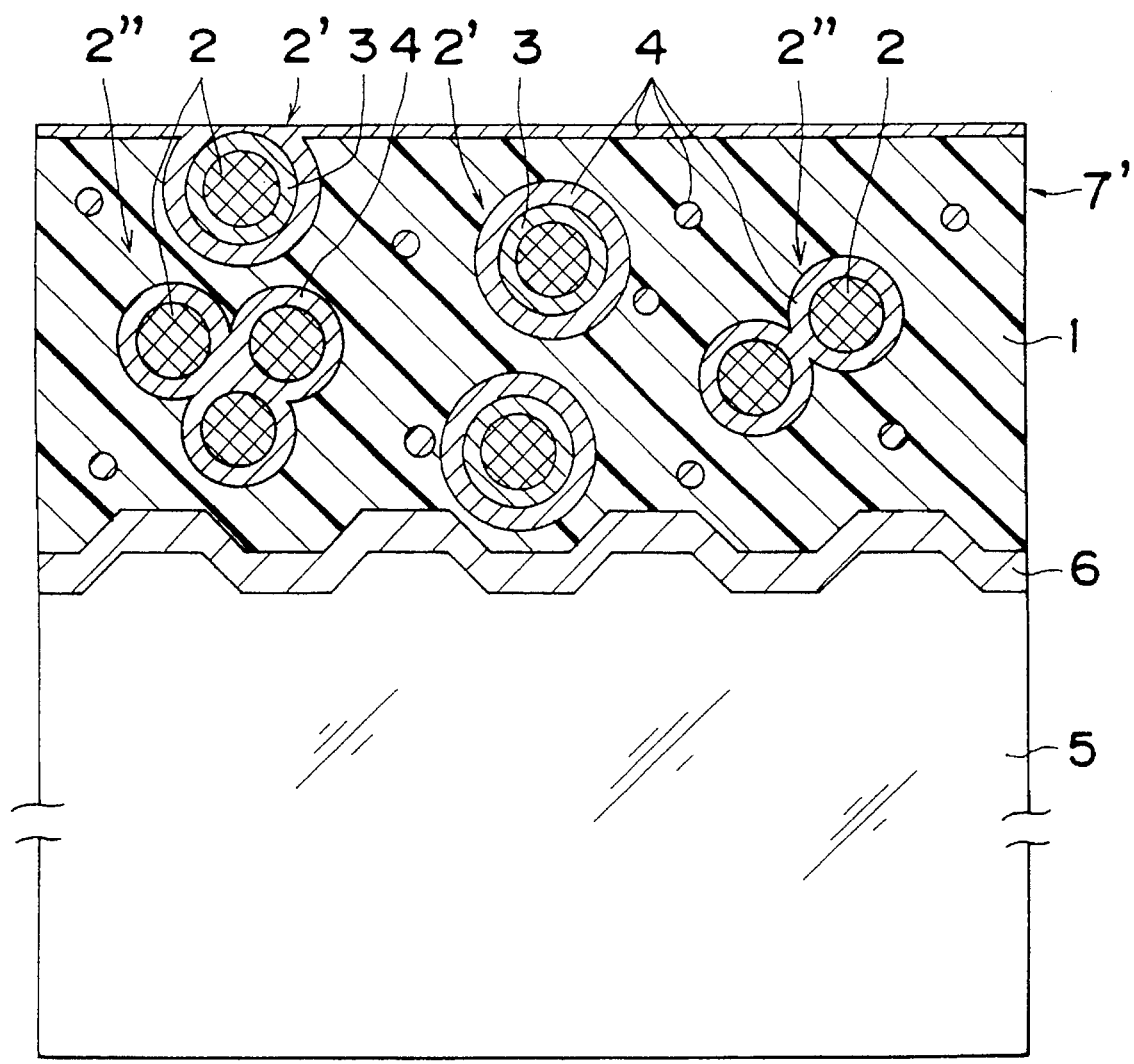
FIG. 6 is a schematic sectional view of a second type of magneto-optic disk.

Next, FIG. 6 shows a different type of protective coating 7' below wherein minute particles 2 consist of both independent particles 2' and aggregates 2" thereof. In other words, minute particles 2 are not dispersed completely in this type. Then, the amount of the lubricant 4 occluded in the protective coating 7' can be increased. On the other hand, in the above-mentioned first type of the protective coating 7, all the minute particles 2 are covered by the surface-coating agent 3. In order to include aggregates 2" of minute particles in the protective coating 7', minute particles which have not been subjected to the surface coating are mixed in the production process as will be explained later.

The enhancement of the occluded amount of the lubricant due to aggregates is explained below by using a simple model. It is assumed that only spherical minute particles of the same radius denoted as "r" exist and that the thickness "t" of the lubricant to coat the surface of the minute particles is constant. The amount of the lubricant to be held by minute particles is compared between a case wherein two minute particles are separated from each other and another case wherein they contact with each other. Then, the volume $V_i$ of the lubricant is expressed as follows when two inorganic minute particles are separated from each other:

$$V_i = (8/3)\pi\{(r+t)^3 - r^3\}.$$

On the other hand, when the two minute particles contact with each other, the volume $V_c$ of the lubricant is expressed as follows:

$$V_c = (4/3)\pi\{(r+t)^3 - 2r^3\} + 2\pi r(r+t)^2.$$

That is, the lubricant is also held in an intermediate space between the two particles. Then, the difference between $V_c$ and $V_i$ is expressed as follows:

$$V_c - V_i = (2/3)\pi(r+t)^2(r-2t).$$

Because r > 2t in the case of the invention, $V_c > V_i$. That is, the amount of the occluded lubricant in the protective coating 7' increases with increase in the number of the contact sites between the minute particles or with increase in the number of aggregates.

However, in order to suppress the probability of the generation of protrusions on the surface of the protective coating 7' due to the contacts, the size of the aggregates 2" and the thickness of the protective coating 7' have to be limited. That is, the thickness of the protective coating 7' is 1.2 times the maximum length of an aggregate or more, preferably 1.5 times the maximum length or more in order to prevent the generation to large protrusions on the surface.

By using the inorganic minute particles 2 as a mixture of primary particles 2' and aggregated particles 2", the amount of the lubricant 4 occluded around the contact points on the aggregated minute particles increases as explained above.

Further, the amount of the lubricant 4 which can be occluded in the protective coating 7' can be increased by controlling the dispersion of the minute particles 2. In the control of the dispersion, minute particles 2 subjected to the surface coating and those not subjected to the surface coating are mixed and then mixed further in the protective coating 7' with other components. Thus, aggregates 2" of minute particles 2 are formed in the protective coating 7', and the lubricant 4 is held near the contact points between minute particles 2, so as to increase the occlusion performance.

Figure 7:
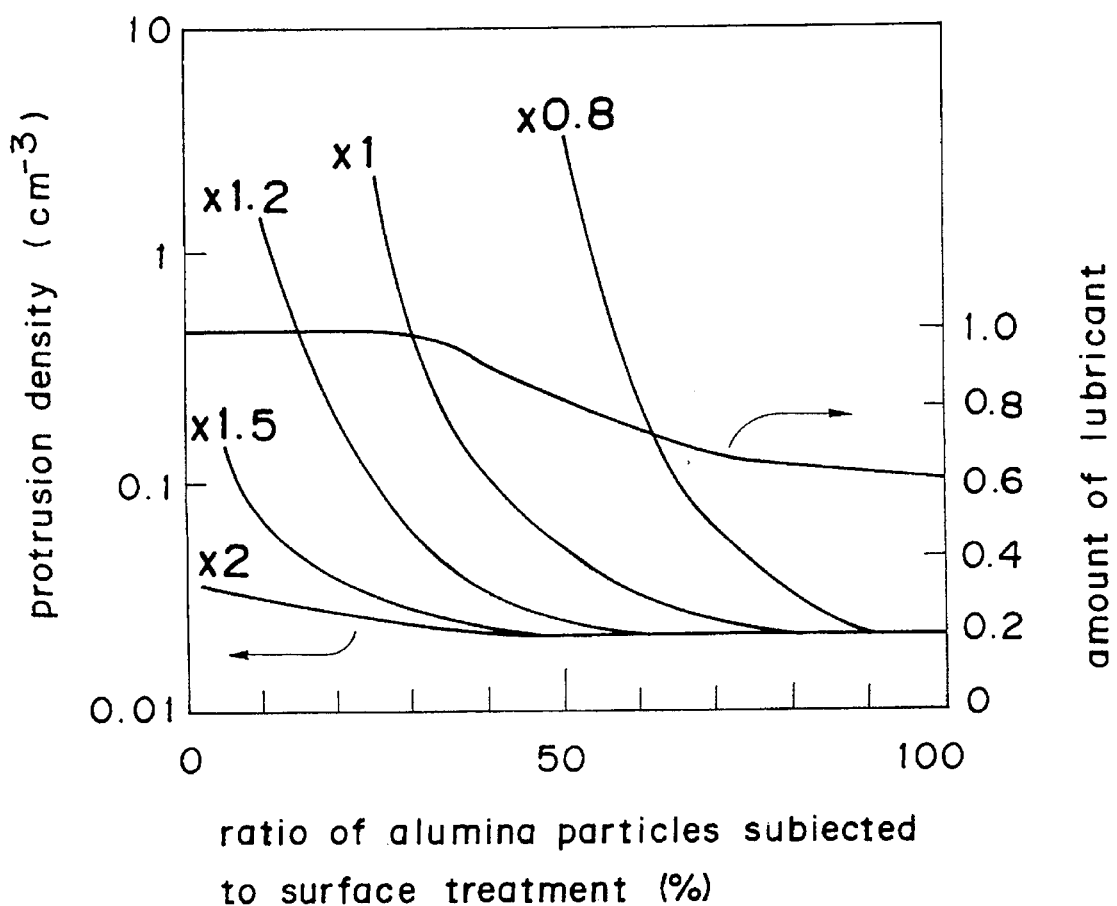
FIG. 7 is a diagram of the amount of the lubricant in the protective coating, and the density of the protrusions on the surface of the protective coating plotted against the mixing ratio of alumina minute particles subjected to the surface coating to those not subjected to the surface coating both of which are to be mixed in the protective coating.

FIG. 7 shows the protrusion density and the amount of the lubricant plotted against the mixing ratio of minute particles subjected to the surface coating to those not subjected to the surface coating. The amount of the lubricant 4 is analyzed quantitatively with chromatography, while the density of protrusions higher than 0.1 μm at the surface of the protective coating 7' is measured. The protrusions are generated due to the aggregation of alumina particles. The protrusion density data are measured for the protective coatings 7' of different thicknesses normalized by the maximum length of the aggregate of alumina particles, as displayed in FIG. 7. If the ratio of the minute particles subjected to the surface coating decreases below about 40%, the amount of the lubricant 4 occluded in the protective coating 7' becomes saturated. In these cases, if the thickness of the protective coating 7' is 1.2 times or more than the maximum length of the aggregates 2", the existence of the protrusions does not hinder the floating of the slider 10. Further, if the thickness is 1.5 times or more than the maximum length of the aggregates 2", the protrusion density is almost equal to that at 100% of the ratio.

In this type of protective coating, it is also preferable that the thickness of the protective coating is between 3 and 50 μm, more preferably between 5 and 10 μm, as in the first type of protective coating. Then, the recording can be conducted surely at bad conditions.

In the above-mentioned examples, the protective coating 7, 7' is formed directly on the magneto-optic recording layer 6. However, an inorganic or organic composite or a mixture thereof as an adhesive layer may be inserted between the magneto-optic recording layer 6 and the protective coating 7' to improve the adhesion intensity between them.

Figure 8:
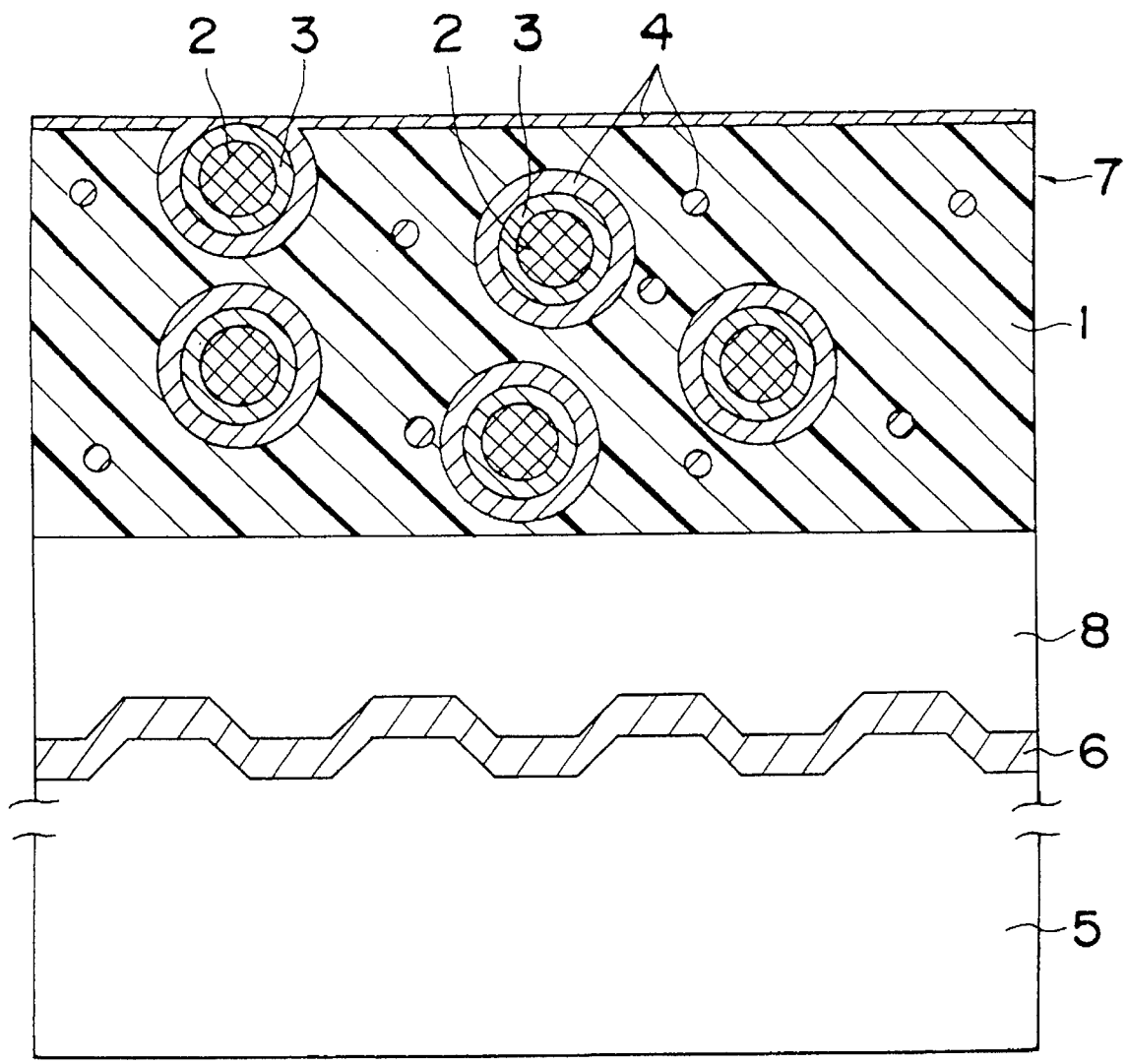
FIG. 8 is a schematic diagram of an example of a third type of magneto-optic disk.
Figure 9:
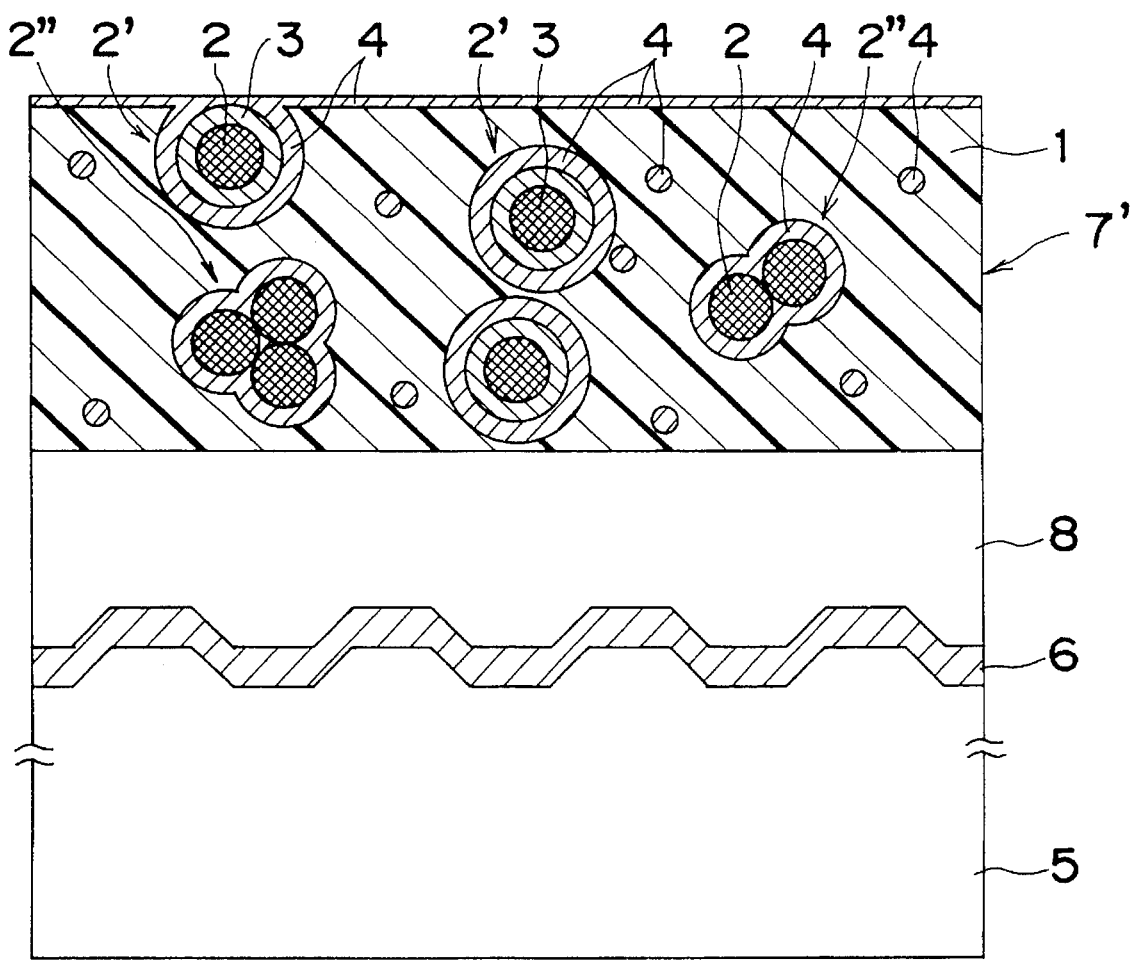
FIG. 9 is a schematic diagram of another example of a third type of magneto-optic disk.

Next, FIGS. 8 and 9 show two examples wherein an adhesive layer 8 is inserted between a protective layer 7, 7' and a magneto-optic recording layer 6. In the magneto-optic disks, a magneto-optic recording layer 6 is formed on a groove plane of a substrate 5. Then, an adhesive layer 8 is formed on the magneto-optic recording layer 8, as will be explained below in detail. Finally, a protective coating 7 or 7' is formed on the adhesive layer 8 similarly to a process of the above-mentioned embodiments shown in FIG. 1 or 6.

The adhesive layer 8 may be formed with spin coating, screen printing, spraying or the like. Among them, spin coating and screen printing are appropriate because the thickness of the layer 8 can be controlled easily.

The adhesive layer 8 is preferably made of a radical-polymerizable compound. When the adhesive layer 8 is formed, a prescribed thickness of a radical-polymerizable compound is formed on the magneto-optical recording layer 6. Then, the compound is heated or irradiated with a light or electronic beam to accelerate the setting reaction to form the adhesive layer 8. In order to improve the adhesion of the adhesive layer 8 with the protective layer 7, 7' to be formed on the adhesive layer 8, the heating or the irradiation with a light or electronic beam is stopped when the degree of setting of the polymerizable compound is 70–90%. Next, after the protective layer 7, 7' is formed, the heating or the irradiation with a light or electronic beam is started again to complete the setting reaction of the polymerizable compound. This step may be performed at the same time as the setting of the protective layer 7, 7'.

The thickness of the adhesive layer 8 is preferably 2 μm or more. However, it is more preferably 5 μm or more in order to prevent penetration of humidity. The thickness is preferably 50 μm or less as to acceleration of the setting with ultraviolet rays. More preferably, the sum of the thickness of the adhesive layer 8 and the protective layer 7, 7' is 50 μm or less.

The adhesive layer 8 is made of an inorganic compound such as a phosphide, a chromium compound or a silicide or an organic compound such as an alkyd resin, a phenolic resin, an amide resin, an acrylic resin, an urethane resin or a silicone resin, or a mixture thereof. However, a radical-polymerizable compound is preferable from the following viewpoints:

(a) It is preferable that adhesion strength to the substrate 5, to the magneto-optic recording layer 6 and to the protective coating 7, 7' is strong.

(b) It is preferable that the adhesive layer 8 does not damage the substrate 5, the magneto-optic recording layer 6 and the protective coating 7, 7'.

(c) It is preferable that it is hard for humidity to penetrate the adhesive layer.

(d) It is preferable that it is elastic.

A photo-setting resin is preferable as a radical polymerizable resin for the adhesive layer 8 of the invention. Especially, a preferable photo-setting resin comprises a mixture of acrylate monomers of pentaerythritol type, alkyl type, trimethylolpropane type, bisphenol A type, isocyanate type or phenoxy type with epoxy acrylate or urethane acrylate. An auxiliary component such as photoradical polymerization initiator or a photosensitized agent may be added thereto.

An advantage of the adhesive layer 8 of the embodiment is that partial cracking of the protective layer 7, 7' can be prevented and that a lubricant performance needed for CSS action can be maintained when the slider 10 bears heavily onto the protective layer 7, 7'. When a resin is used as the substrate 5 of a magneto-optic disk, expansion and extraction of a size thereof are larger than a case with the substrate 5 made of a ceramic such as glass when environment such as temperature or humidity changes. Further, because the expansion and extraction are not uniform at each portion of the substrate, it is liable to bend or be distorted. If such modification occurs, it affects the protective layer 5 formed thereabove and the surface of the protective layer 5 is liable to undulate. If the degree of undulation becomes large, a density of air film between the slider 10 and the protective layer 7, 7' changes largely, and this affects a floating quantity of the slider 10. Especially, if a floating quantity of a back end of the slider 10 becomes larger than that of a front end thereof, the slider 10 collides with the protective layer 7, 7'. The adhesive layer 8 enhances adhesion of the protective layer 7, 7' and can protect the protective layer against heavy pressure of the slider on the protective layer 7, 7'.

Another advantage of the adhesive layer 8 of the embodiment is that it can prevent cracking of the protective layer 7, 7' as a component of a magneto-optic disk when environment such as temperature or humidity changes so as to improve the reliability of a magneto-optical disk. When environment such as temperature or humidity of a magneto-optic disk changes, radical polymerizable compound 1 in the protective layer 7, 7' generates a stress of expansion and compression. If a stress of expansion occurs, minute particles 2 dispersed in an inorganic compound 1 are subjected to a stress of compression. If minute particles 2 are located at a boundary of the radical polymerizable compound 1, the minute particles 2 may be pushed from the compound 1 to the exterior. A displacement quantity of such a case is 1 μm or less in an environment of 60° C. and 80%RH, and the movement of the minute particles 2 does not affect the movement of the slider 10. On the other hand, if the protective layer 7, 7' exists on the magneto-optic recording layer 6 and minute particles 2 are located at an interface with the magneto-optic recording layer 6, a stress is given to a protective layer, a record layer and a reflection layer all comprising the magneto-optic recording layer 6. If the magneto-optic recording layer 6 is formed on a substrate 5 made of resin, the minute particles 2 push each layer in the magneto-optic recording layer 6, and this may generate local distortions in the relatively soft substrate 5. In the worst case, films in the magneto-optic recording layer 6 are broken. Especially, a hard protective layer therein may be broken, and if this happens, the recording layer 6 is broken. The adhesive layer 8 of the embodiment functions as a buffer material to prevent damage of layers in the magneto-optic recording layer 6. By providing the adhesive layer 8 of thickness of 2 μm or more, the local shear stress can be prevented in the magneto-optic recording layer 6.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A magneto-optic disk comprising a substrate, a magneto-optic recording layer applied to the substrate and a protective coating applied to the magneto-optic recording layer, the protective coating being made from a composite comprising minute particles of an inorganic compound having a particle size of 0.02–2 μm, the surfaces of the minute particles being coated with a surface coating agent, a lubricant and a radical-polymerizable compound, the surface coating agent having a lyophilic property with respect to the radical-polymerizable compound, and wherein 5–50 wt % of the minute particles is included in the protective coating based on the total weight of the minute particles, surface coating agent, lubricant and radical-polymerizable compound.

2. The magneto-optic disk according to claim 1, wherein said surface coating agent is a metallic soap expressed by a following formula:

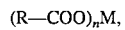

(R—COO)$_n$M,

R—SO$_3$M or

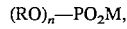

(RO)$_n$—PO$_2$M, wherein R denotes an alkyl group, M denotes a metallic ion and n is an integer between one and four.

3. The magneto-optic disk according to claim 1, wherein the surface coating agent is a polyethylene glycol ester or a polyethylene glycol ether.

4. The magneto-optic disk according to claim 1, wherein the surface coating agent is a compound of the following formula:

$$(R)_m-M-(OR')_n,$$

wherein R denotes an alkyl group, M denotes Si, Ti or Al, R' denotes $CH_3$, $C_2H_5$ or $C_3H_7$, m is an integer between one to three and n is an integer between one to three.

5. The magneto-optic disk according to claim 1, wherein the surface coating agent is a polyacrylic acid ester or a polyamine.

6. A method for producing the magneto-optic disk according to claim 1, comprising the steps of:
providing said substrate;
forming said magnetic recording layer on said substrate;
coating the surfaces of some of said minute particles of an inorganic compound with said surface coating agent;
mixing said minute particles, said lubricant and said radical-polymerizable compound; and
applying the resultant mixture to the magnetic recording layer to form said protective coating.

7. The magneto-optic disk according to claim 1, wherein said minute particles are one or a mixture of compounds selected alumina, silica, zirconia, silicon nitride and silicon carbide.

8. The magneto-optic disk according to claim 1, wherein said minute particles have 0.05–2 μm average particle size.

9. The magneto-optic disk according to claim 1, wherein said radical-polymerizable compound is a photo-setting resin.

10. The magneto-optic disk according to claim 1, wherein said minute particles are porous particles having 100–1000 $m^2/g$ of specific surface area of the BET adsorption isotherm.

11. The magneto-optic disk according to claim 1, further comprising an adhesive layer interposed between said magneto-optic recording layer and said protective coating.

12. The magneto-optic disk according to claim 1, wherein the surface coating agent is selected from the group consisting of an alkyl ether, an alkyl ester, an alkyl amine, an alkyl amide, a glycerin ester and a sorbitan ester.

13. The magneto-optic disk according to claim 9, wherein said photo-setting resin is a phosphazen ultra-ray-setting resin of the following formula:

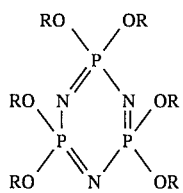

wherein R denotes

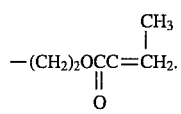

14. The magneto-optic disk according to claim 9, wherein said photo-setting resin is an epoxy acrylate resin.

15. The magneto-optic disk according to claim 9, wherein said photo-setting resin is an urethane resin.

16. The magneto-optic disk according to claim 11, wherein said adhesive layer comprises a resin including a radical-polymerizable compound.

17. The magneto-optic disk according to claim 16, wherein said radical-polymerizable compound comprises an ultraviolet-ray setting resin.

18. The magneto-optic disk according to claim 11, wherein the sum of the thicknesses of said adhesive layer and said protective coating is between 5 and 50 μm.

19. A magneto-optic disk comprising a substrate, a magneto-optic recording layer applied to the substrate and a protective coating applied to the magneto-optic recording layer, the protective coating being made from a composite comprising a first type of minute particles of an inorganic compound having a particle size of 0.02–2 μm, a second type of minute particles of the inorganic compound having a particle size of 0.02–2 μm, a lubricant and a radical-polymerizable compound, the surfaces of the minute particles of the first type being coated with a surface coating agent, the minute particles of the second type having not been subjected to the surface coating with use of the surface coating agent before forming the composite, and wherein the ratio of the first type of minute particles is at least 40% of the total of the first and second types of minute particles, and the minute particles of the second type may form aggregates, and if the aggregates are formed the thickness of the protective coating is at least 1.2 times the maximum length of the aggregates.

20. The magneto-optic disk according to claim 19, wherein said surface coating agent is a metallic soap expressed by a following formula:

$$(R-COO)_n M,$$

$$R-SO_3 M$$

or $$(RO)_n-PO_2 M,$$

wherein R denotes an alkyl group, M denotes a metallic ion and n is an integer between one and four.

21. The magneto-optic disk according to claim 19, wherein the surface coating agent is a polyethylene glycol ester or a polyethylene glycol ether.

22. The magneto-optic disk according to claim 19, wherein the surface coating agent is a compound of the following formula:

$$(R)_m-M-(OR')_n,$$

wherein R denotes an alkyl group, M denotes Si, Ti or Al, R' denotes $CH_3$, $C_2H_5$ or $C_3H_7$, m is an integer between one to three and n is an integer between one to three.

23. The magneto-optic disk according to claim 19, wherein the surface coating agent is a polyacrylic acid ester or a polyamine.

24. A method for producing the magneto-optic disk according to claim 19, comprising the steps of:

providing said substrate;

forming said magnetic recording layer on said substrate;

coating the surfaces of some of said minute particles of an inorganic compound with said surface coating agent, the surface of the other of said minute particles being remained not coated with said surface coating;

mixing said minute particles, said lubricant and said radical-polymerizable compound; and applying the resultant mixture to the magnetic recording layer to form said protective coating.

25. The magneto-optic disk according to claim 19, wherein said minute particles are one or a mixture of compounds selected from the group consisting of alumina, silica, zirconia, silicon nitride and silicon carbide.

26. The magneto-optic disk according to claim 19, wherein said radical-polymerizable compound is a photo-setting resin.

27. The magneto-optic disk according to claim 19, wherein the specific surface area of said minute particles of the first and second types is 100–1000 m²/g as measured with BET isotherms.

28. The magneto-optic disk according to claim 19, wherein said protective coating has a thickness of 3–50 μm.

29. The magneto-optic disk according to claim 19, further comprising an adhesive layer interposed between said magneto-optic recording layer and said protective coating.

30. The magneto-optic disk according to claim 19, wherein the surface coating agent is selected from the group consisting of an alkyl ether, an alkyl ester, an alkyl amine, an alkyl amide, a glycerin ester and a sorbitan ester.

31. The magneto-optic disk according to claim 26, wherein said photo-setting resin is a phosphazen ultra-ray-setting resin of the following formula:

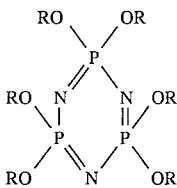

wherein R denotes

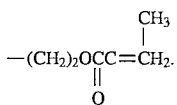

32. The magneto-optic disk according to claim 26, wherein said photo-setting resin is an epoxy acrylate resin.

33. The magneto-optic disk according to claim 26, wherein said photo-setting resin is an urethane resin.

34. The magneto-optic disk according to claim 29, wherein said adhesive layer comprises a resin including a radical-polymerizable compound.

35. The magneto-optic disk according to claim 34, wherein said radical-polymerizable compound comprises an ultraviolet-ray setting resin.

36. The magneto-optic disk according to claim 29, wherein the sum of the thicknesses of said adhesive layer and said protective coating is between 5 and 50 μm.

* * * * *